Feb. 22, 1966  W. R. SCHOBER  3,237,051
DIRECT CURRENT WELDER WITH VARIABLE REACTOR
Filed Dec. 13, 1961  2 Sheets-Sheet 1

INVENTOR.
WILLIAM SCHOBER
BY
ATTORNEYS

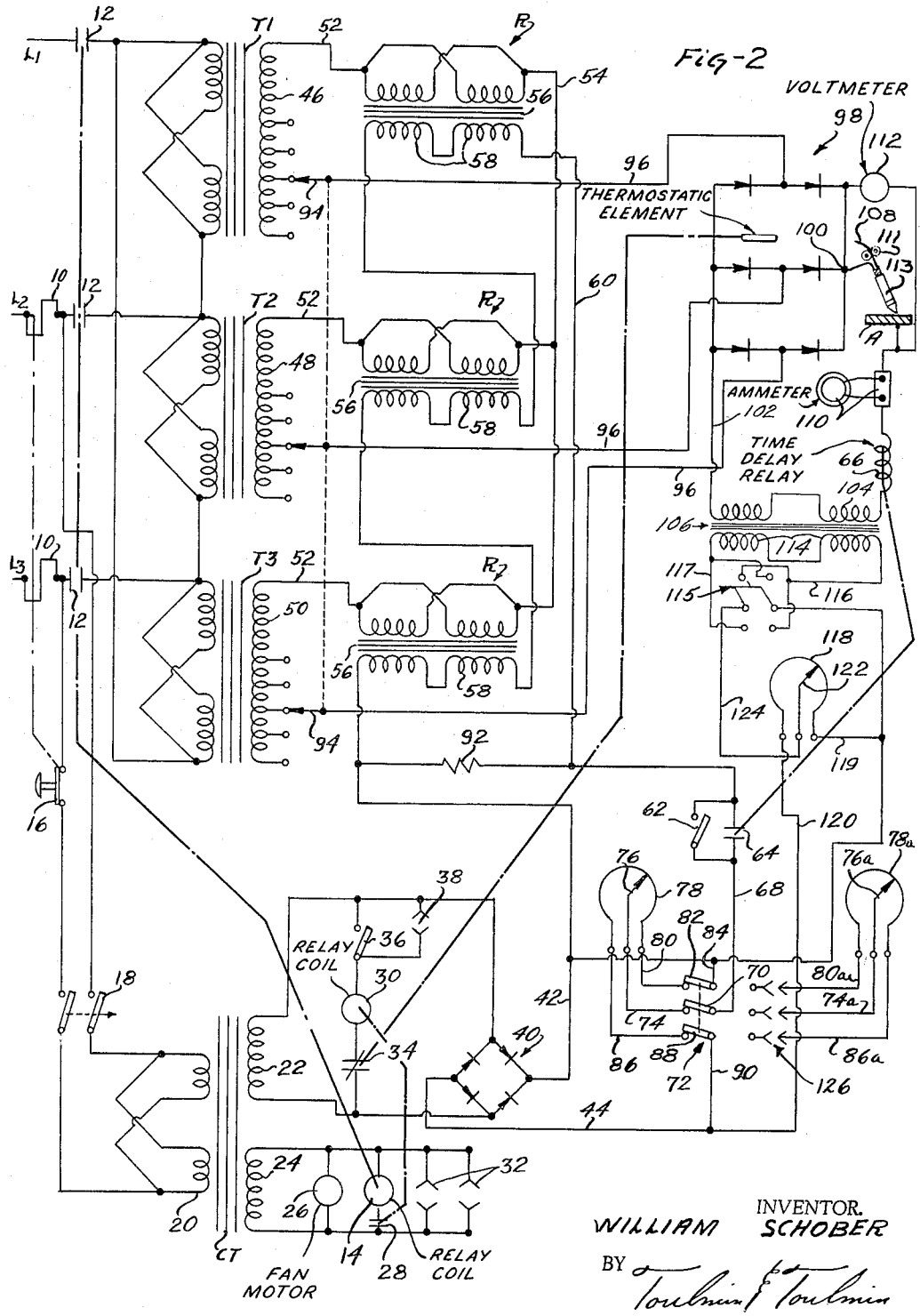

United States Patent Office 3,237,051
Patented Feb. 22, 1966

3,237,051
DIRECT CURRENT WELDER WITH
VARIABLE REACTOR
William R. Schober, Troy, Ohio, assignor to Hobart Brothers Company, Troy, Ohio, a corporation of Ohio
Filed Dec. 13, 1961, Ser. No. 158,984
10 Claims. (Cl. 315—137)

This invention relates to direct current welders and is particularly concerned with a direct current welder utilizing a stabilizing reactor arrangement in the output side and employed for automatic or semi-automatic welding.

Direct current welders are known and a common type employs a bank of transformers the output from which is rectified to supply direct current to the work. A problem that has always been present in connection with welders of this nature is the proper stabilization of the welding current supply. It is with this particular problem that the present invention is concerned and the problem is met, basically, by inserting a controllable saturable core reactor in the direct current output line.

The particular type reactor that is proposed to employ in the welding circuit may be one of the type illustrated in the Glyn O. Williams application, Serial No. 159,179, filed December 13, 1961, now abandoned, but it will be apparent as the description proceeds, that other types of reactors could be employed.

With the foregoing in mind, a primary object of the present invention is the provision of an improved direct current welder arrangement.

Another object of this invention is the provision of a direct current welder arrangement in which improved voltage stability is had at the welding electrodes.

Still a further object of this invention is the provision of a direct current welding arrangement having a variable saturable coil reactor in series with the welding electrodes on the output side of the welder for stabilizing the welding voltage.

These and other objects and advantages of this invention will become more apparent upon reference to the following specification, taken in connection with the accompanying drawings, in which:

FIGURE 2 is a diagrammatic representation of the wiring diagram of the welder.

Figure 1:
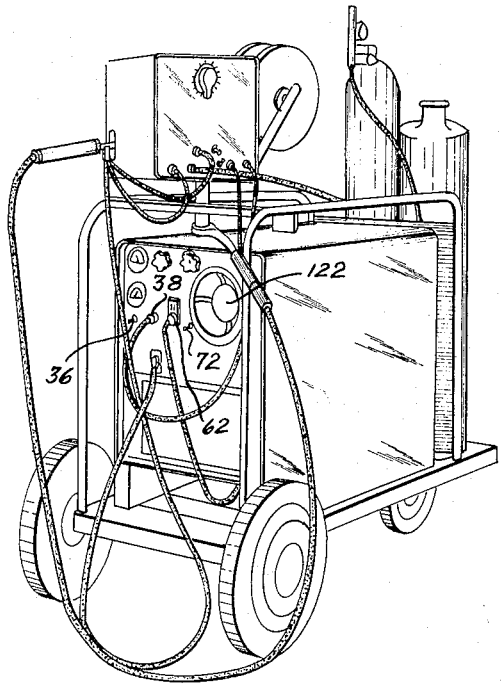
FIGURE 1 is a perspective view showing an automatic direct current welder according to my invention.

Referring to the drawings somewhat more in detail, the welder according to the present invention may comprise a bank of three transformers which are indicated in FIGURE 2 at T1, T2, and T3. The primaries of these transformers are connected in the circuit in delta with the power lines L1, L2 and L3. At least two of these power lines may include overload heater elements 10 and each of the power lines has therein a set of normally open blades 12 which are under the control of a contacter coil 14.

Two of the power lines, L2 and L3, lead through an on-off switch 18 to the primary 20 of a control transformer CT. An overload switch 16 is in line L3. The control transformer has a first secondary winding 22 and a second secondary winding 24. Across the terminals of the second secondary winding is connected a fan motor 26 which is positioned within the welder so that it can blow cooling air over the transformers and the reactors and the rectifiers that form a part of the transformer structure.

Also connected across the terminals of secondary 24 of transformer CT is the coil of relay 14 which is in series with the normally open blades 28 of a pilot relay 30.

There are also connected across the terminals of secondary 24 receptacles 32 which can be employed for supplying a standard voltage, say, one hundred fifteen volts, for auxiliary purposes.

Across the terminals of secondary 22 is the coil of pilot relay 30 which is in series with normally closed contacts 34 of a thermostatic element, which element is positioned to be sensitive to temperature conditions in the region of the rectifiers. This thermostatic element opens when the rectifier's temperature exceeds a predetermined maximum.

Also in series with coil 30 of the pilot relay is a selector switch 36 which is paralleled by a receptacle 38. When switch 36 is closed, receptacle 38 is inoperative and the welding arrangement is under local control but when switch 36 is opened, an extension can be plugged into receptacle 38 and pilot relay 30 can be controlled from a remote point.

There is also connected across the terminals of secondary 22 a rectifier bridge 40 which has its other terminals connected to wires 42 and 44.

Returning now to transformers T1, T2, and T3, each thereof has a secondary winding indicated at 46, 48, and 50, respectively, each of which has a plurality of taps. The one end of each of the secondaries is connected by a wire 52 with one terminal of a reactor R pertaining to that particular secondary. The windings of reactors R to which the wires 52 are connected have their opposite ends interconnected by a wire 54 so that the said windings are connected in Y or star.

The reactors have iron cores 56 and have other windings 58. These other windings are connected in series with one terminal of the serially connected windings 58 being connected directly with aforementioned wire 42 leading to one output terminal of the rectifier bridge 40. The other end of the serially connected windings 58 is connected by a wire 60 to one end of a selector switch 62 which is in parallel with a normally open blade 64 of a time delay relay which has a control coil 66 pertaining thereto. The other side of switch 62 is connected by a wire 68 with a blade 70 of a double throw three bladed switch generally indicated at 72. As switch 72 is illustrated in FIGURE 2, blade 70 is closed on a contact that is connected to a wire 74 leading to the movable contact arm 76 of a potentiometer 78.

One of the outer terminals of potentiometer 78 is connected by wire 80 with a contact on which blade 82 of switch 72 is closed, with said blade 82 being connected by wire 84 with the aforementioned wire 42.

The opposite outer terminal of potentiometer 78 is connected by wire 86 with a contact on which blade 88 of switch 72 is closed and which blade is connected by wire 90 with the aforementioned wire 44 leading to the other output terminal of rectifier bridge 40.

As will be seen in the drawings, there is a discharge resistor 92 connected between wires 42 and 60 so as to be placed in circuit directly across the serially connected windings 68 of the aforementioned reactors.

The tap connections of the secondary windings 46, 48, and 50 are under the control of a switch 94 so that all of the taps can be changed at one time. Wires 96 lead from the three blades of this switch to the three input terminals of a three phase full wave rectifier bridge 98. One of the output terminals at 100 of the rectifier bridge is connected to the welding wire 108, whereas the other output terminal of the rectifier bridge is connected by wire 102 with one end of the winding 104 of a reactor 106. The other end of winding 104 is connected via coil 66 of the time delay relay with the work A. An ammeter and shunt at 110 can be included in this connection which indicate the welding current.

There may also be provided a voltmeter 112 connected between the electrode and the opposite side of the rectifier bridge 98 to indicate the arc voltage.

The circuit of the present invention is particularly designed for continuous welding operations in which a wire is fed through a torch or gun. The welding wire, indicated at 108, is fed between feed rollers 111 through a torch or gun 113 where it operatively engages the work. The connection to the wire 108 is generally made through a metallic guide sheath therefore which, for the sake of convenience, is not illustrated in the drawings. The exact connections to the work and the welding wire are, however, well known in the trade.

Ordinarily, with automatic welders, in connection with which the present invention is particularly useful, reverse polarity is normally used so that the welding wire is positive and the work is negative. It will be understood, however, that this is not to be considered as limiting in this application.

The aforementioned reactor 106 has the control windings 114 thereon with the ends of the windings being connected by wires 116 and 117 with terminals of a reversing switch 115, the blades of which are connected, one with the aforementioned wire 84 that leads from wire 42 to blade 82 of switch 72, and the other being connected by wire 124 to the movable center tap 122 of potentiometer 118. The blade of switch 115 which is connected to wire 84 is also connected by wire 119 to one of the outer terminals of potentiometer 118 the other outer terminal of which is connected by wire 120 with wire 44.

The movable tap at 122 of the potentiometer 118 is connected by wire 124 with the other blade of switch 115.

In addition to potentiometer 78, there is provided an auxiliary remote control potentiometer 78a having one side connected by a wire 80a with a contact on which blade 82 of switch 72 is closed when the switch is thrown to the position opposite that which it occupies in FIGURE 2.

The slider contact 76a of the potentiometer is connected by a wire 74a with a contact on which blade 70 of the switch will close, and the opposite end of the potentiometer is connected by a wire 86a with a contact on which blade 88 of switch 72 will close. The wires 74a, 80a and 86a represent an extension so that the potentiometer 78a can be positioned remote from the welding transformer.

To this end, there is provided receptacle means generally indicated at 126 by means of which the remote control potentiometer or rheostat 78a can be plugged into the welding transformer when desired. Ordinarily, when the remote control potentiometer 78 is employed, switch 36 will be open and there will be a control switch plugged into receptacle 38 so that the entire transformer can be controlled from a remote location.

Figure 3:
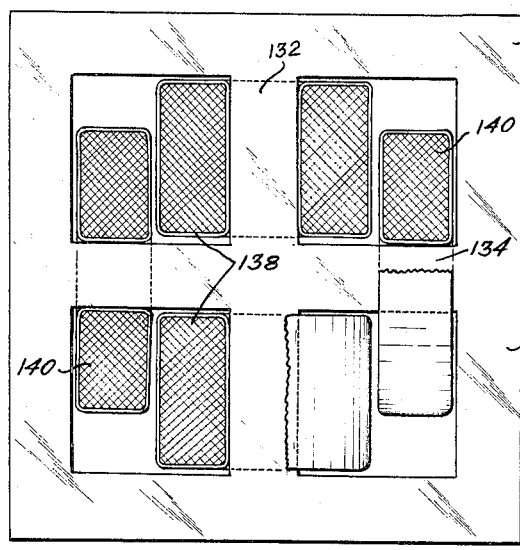
FIGURE 3 is a view, partly in section, of one of the saturable reactors employed in the welding circuit.

The reactors R and 106 may be constructed as indicated more or less diagrammatically in FIGURE 3. In FIGURE 3, there is a laminated iron core 130 which may take a cruciform shape with two intersecting legs 132 and 134 extending between the outer frame 136 of the core.

On legs 132, there may be placed the load windings 138 which would correspond with the windings 104 of reactor 106 or with the windings on the reactors R that are connected between wires 52 and 54. These load windings are ordinarily connected additively when the reactor is employed between the transformer secondaries and the rectifier bridge so that the load flux therefrom passes through the vertical leg 132 and about the outer part 136 of the magnetic frame.

As to reactor 106, however, the load windings are connected in opposition and the load flux passes through both legs of the reactor core and around all the windows of the core. The load flux in this case (D.C. operation) thus passes through the control coils of the reactor.

On leg 134 of the reactor there are mounted windings 140 which would correspond to windings 58 of the reactors R or windings 114 of reactor 106. The windings 140 are the control windings and are connected in opposition when the reactor is in the transformer secondary circuit and are variably energized in order to vary the degree of saturation of the magnetic path of the coils 138. When the reactor is in the D.C. welding current output circuit the control winding can be arranged so the flux therefrom is in either additive or opposing relation to the flux from the load coils.

The coils 140 are disposed substantially completely outside for A.C. operation, the magnetic path of the coils 138 and are thus substantially isolated from steady state flux linkages with the load coils.

In order to provide for reversing of the current through the control windings 114 of reactor 106 whereby the control coils will be arranged in either additive or subtractive relation with respect to the load windings 104, there is connected between potentiometer 118 and the said control windings, a reversing switch 115. In one position of this switch, the current through the control windings is in one direction and, in the other position, it is in the opposite direction.

This switch could, of course, be included in the circuit to the said control windings either ahead of or behind potentiometer 118 and exactly the same conditions would prevail in both cases.

OPERATION

In operation, the switch 18 is first closed thereby energizing the primary side of control transformer CT. This will energize the secondary winding 24 thereof so that fan motor 26 will start immediately while the receptacles 32 will be energized at one hundred fifteen volts.

Secondary 22 of the control transformer is also energized and with switch 36 closed, the coil 30 of the control contactor will be energized. This will cause blades 28 thereof to close and this will, in turn, energize coil 14 of the contactor which controls blades 12. Blades 12 will then close and this will energize the primary sides of transformers T1, T2, and T3.

The aforementioned energization of secondary 22 of the control transformer also energizes rectifier bridge 40 so that a supply of current is available for the control coils 58 of reactors R. This control current will only flow, however, if switch 62 is closed.

If this switch is open, no control current will flow until after the arc is struck and a predetermined time has elapsed thereafter so that the time delay relay comprising coil 66 and blade 64 will close.

If switch 36 is open, then the aforementioned sequence of events with respect to the supply of control current to control coils 58 will commence when the remote control switch plugged into receptacle 38 is closed.

With the primaries of transformers T1, T2, and T3 energized, the open circuit voltage appearing at the welding terminals is determined by the setting of tap changing switch 94 and is not effected by the setting of any of the voltage control rheostats 78, or 78a, or 118 and, further, it is not effected by the setting of switch 62.

After the arc is struck, however, the voltage control rheostats 78, or 78a, depending on the adjusted position of switch 70, permits adjustment of the arc voltage over a range of about nine volts. Switch 62 is provided for improving the conditions during which an arc is established. When the arc is initiated, transient flux linkages are set up between the load coils and control coils of the A.C. reactors, resulting in a sharp rise in control current. The effect of this rise is to raise the output voltage of the machine for a time determined by the time constants of the circuit. This rise in voltage will result in improper bead contour and in extreme cases, undercutting at each side of the bead, until this transient is dissipated. This phenomenon is particularly noticeable when the arc is initiated while the head is moving as it does in fully automatic applications, at travel speeds of over 100 inches per minute. The switch 62 holds the control circuit open until the wire touches the work. The delay time of switch 64 is long enough to make the flux linkage energy mentioned above appear as voltage induced in the control coils. The time constant of the welder is short when the control circuit is open, and as a result, this induced voltage dissipates rapidly. As a result, the arc voltage is low during recovery when striking, rather than high, resulting in good bead contour at the start of the weld with no undercutting.

If, during operation of the transformer, the output rectifier 98 overheats, the blades 34 under the control of a thermostatic element positioned in the region of the output rheostats will open, thus deenergizing contactor 30 which will open its blades 28 and then deenergize contactor 14 and interrupt the supply of power to the primaries of transformers T1, T2, and T3. Control transformer CT remains energized, however, and fan 26 will thus continue to run and supply cooling air to the rectifiers. The receptacles 32 also remain energized.

When the output rectifier 98 cools sufficiently to permit blades 34 to close, the aforementioned starting conditions are again reestablished and welding can again be commenced.

Under extreme conditions, overload elements 10 will cause tripping of switch 16 which will deenergize the entire system, and a manual re-setting is required before the welding operation can again be resumed.

From the foregoing, it will be apparent that the reactors R provide a ready means for giving desired but variable voltage regulation at the welding arc. By increasing the saturation of the cores of the reactors, the amount of reactance in the secondary circuit of the welding transformers is reduced and, vice versa, so that the voltage supplied to the full wave rectifier 98 is thus under close and easy regulation at all times.

The reactors R also provide some stabilizing effect to eliminate extreme surges in the secondary current but a more pronounced and effective stabilization is had by the reactor 106 which is located in the direct current output side of the output rectifier 98. The reactor 106, since it is disposed in the direct current output side of the output rectifier bank 98, does not carry alternating current and thus has no influence on the regulation of the voltage supply. However, this reactor can be made extremely sensitive to current surges in the welding current and thus has a strong stabilizing effect on the welding arc.

As mentioned above, the primary feature of the present invention is the insertion in the direct current circuit of a reactor which will stabilize the welding current. This reactor is an iron cored, saturable core device and the load windings are connected, preferably, in opposing relation so that there is a closed magnetic path for each of the load windings. These magnetic paths have portions in common and on these common portions are mounted the control windings which are supplied with direct current from the control transformer and the rectifier connected between the control transformer secondary and the control windings.

This circuit includes a potentiometer so that the amount of control current flowing in the control coils can easily be adjusted to exactly what is desired.

The control windings can be arranged so that the magnetomotive force therefrom is either in opposition or additive with relation to the magnetomotive forces of the control windings and, in this manner, the exact amount of inductive reactance introduced into the direct current welding circuit can be closely controlled. The flexibility of the reactor and the ease of adjustment thereof makes it suitable for wide ranges of welding current so that it can be effective at low welding currents and it can also be effective at very high welding currents.

In order to add flexibility to the described arrangement, there is a reversing switch provided in the circuit to the control windings which can be operated to reverse the direction of current in the control windings.

The entire welding unit is relatively compact and is convenient to control and operate and improved results are had for the reasons given above.

It will be understood that the specific reactor design disclosed in detail in this application is not essential for attaining the benefits of a variable reactance in the direct current welding circuit. The reactor disclosed is preferred for the reason that it has a high degree of flexibility, but it is possible to use a more simple variable reactor such as a simple transformer core with the windings thereon.

It will be understood that this invention is susceptible to modification and in order to adapt it to different usages and conditions and, accordingly, it is desired to comprehend such modifications within this invention as may fall within the scope of the appended claims.

I claim:
1. In an electric welder; a source of direct current, welding electrodes, and a reactor, said reactor having an iron core, load windings on the core connected between said source and said electrodes, control windings on said core energizeable by direct current, a control transformer, a rectifier bridge having input terminals connected to be supplied by said transformer and also having output terminals, and a potentiometer connected between the output terminals of said rectifier bridge and said control windings for variably supplying direct current to said control windings, and a reversing switch in the circuit between said rectifier bridge and said control windings for selectively reversing the direction of the current therein, said control windings being magnetically linked to said load windings by said core so that energization of the control windings will effect magnetization of the core and control the reactance of said load windings.

2. In an electric welder; transformer means having primary winding means and secondary winding means, output terminals for welding current, rectifier means connected between said secondary winding means and said terminals to convert the alternating current output of said secondary winding means into a direct current supply to said terminals, a saturable core reactor means connected between said rectifier means and at least one of said terminals for stabilizing the supply of direct current to said terminals, and means for variably reversibly saturating the core of said reactor means.

3. In an electric welder; transformer means having primary winding means and secondary winding means, output terminals for welding current, rectifier means connected between said secondary winding means and said terminals to convert the alternating current output of said secondary winding means into a direct current supply to said terminals, first saturable core reactor means connected between said secondary winding means and said rectifier means, second saturable core reactor means connected between said rectifier means and at least one of said terminals for stabilizing the supply of direct current to said terminals, said reactor means comprising an iron core and a control winding pertaining to the core energizable with direct current for magnetizing the core, a source of direct current connected to the control winding of said first reactor means for controlling the degree of saturation of the iron core thereof, and a variable reversible source of direct current connected to said control winding of said second reactor means for controlling the degree of saturation of said iron core of said second reactor means, a normally open switch in the circuit between said source of direct current and the control winding of said first reactor means, time delay means operable for closing said switch, and means responsive to initiation of current flow at said terminals for actuating said time delay means.

4. In an electric welder; transformer means having primary winding means and secondary winding means, output terminals for welding current, rectifier means connected between said secondary winding means and said terminals to convert the alternating current output of said secondary winding means into a direct current supply to said terminals, and saturable core reactor means connected between said rectifier means and at least one of said terminals for stabilizing the supply of direct current to said terminals, said reactor means having an iron core and a load winding thereon connected between said rectifier means and the said one of said terminals, said reactor means also having control winding means adapted for variable energization to effect variable saturation of said core, a source of direct current, a potentiometer comprising resistance means connected across said source of direct current, a sliding contact on said potentiometer, said control winding being connected between one terminal of said potentiometer and said sliding contact, and a reversing switch between said source of direct current and said control winding means.

5. In combination, in an electric welder; main transformer means having primary winding means and secondary winding means, welding current output terminals, rectifier means connected between said secondary winding means and said terminals to convert the alternating current output of said secondary winding means into a direct current supply to said welding terminals, first saturable core reactor means and also having iron core means and connected between said secondary winding means and said rectifier means, second saturable core reactor means having iron core means and load winding means, said load winding means being connected between said rectifier means and at least one of said terminals, said first and second reactor means having control winding means adapted for being variably energized by a variable direct current for variably saturating the said iron core, a control transformer having a secondary winding, a rectifier connected between the secondary winding of said control transformer and the control winding means of said first and second reactor means for supplying direct current to the control winding means, resistance means in circuit with the respective control winding means for selectively varying the amount of direct current supplied thereto, a reversing switch in the circuit between the control winding means of said second reactor means and said rectifier, a resistor connected across the control winding means of said first reactor means, a normally open switch in the circuit between said rectifier and the control winding means of said first reactor means, and means operable in response to the initiation of current flow at said welding terminals for closing said switch after a predetermined time delay.

6. In an electric welder; transformer means having primary winding means and secondary winding means, output terminals for welding current, rectifier means connected between said secondary winding means and said terminals to convert the alternating current output of said secondary winding means into a direct current supply to said terminals, first saturable core reactor means connected between said secondary winding means and said rectifier means, second saturable core reactor means connected between said rectifier means and at least one of said terminals for stabilizing the supply of direct current to said terminals, each said reactor means comprising an iron core and a control winding pertaining to the core energizable with direct current for magnetizing the core, a variable source of direct current connected to said control windings for controlling the degree of saturation of the said iron cores pertaining thereto, a normally open switch in the circuit between said source of direct current and the control winding of said first reactor means, time delay means operable for closing said switch, means responsive to initiation of current flow at said terminals for actuating said time delay means, and a reversing switch in the connection between said source of direct current and the control winding of said second reactor means.

7. In an electric welder; transformer means having primary winding means and secondary winding means, output terminals for welding current, rectifier means connected between said secondary winding means and said terminals to convert the alternating current output of said secondary winding means into a direct current supply to said terminals, first saturable core reactor means connected between said secondary winding means and said rectifier means, second saturable core reactor means connected between said rectifier means and at least one of said terminals for stabilizing the supply of direct current to said terminals, each said reactor means comprising an iron core and a control winding pertaining to the core energizable with direct current for magnetizing the core, a variable source of direct current connected to said control windings for controlling the degree of saturation of the said iron core pertaining thereto, a normally open switch in the circuit between said source of direct current and the control winding of said first reactor means, time delay means operable for closing said switch, means responsive to initiation of current flow at said terminals for actuating said time delay means, a resistor shunted directly across the control winding of said first reactor means, and a reversing switch in the connection between said source of direct current and the control winding of said second reactor means.

8. In combination, in an electric welder; main transformer means having primary winding means and secondary winding means, welding current output terminals, rectifier means connected between said secondary winding means and said terminals to convert the alternating current output of said secondary winding means into a direct current supply to said welding terminals, first saturable core reactor means having iron core means and having load winding means thereon serially connected between said secondary winding means and said rectifier means, second saturable core reactor means having an iron core and a load winding, said loading winding being connected between said rectifier means and at least one of said terminals, said first and second reactor means having control winding means adapted for being variably energized by a variable direct current for variably saturating the said iron cores thereof, a control transformer having a secondary winding, a rectifier connected between the secondary winding of said control transformer and the control winding means of said first and second reactor means for supplying direct current to the said control winding means, resistance means in circuit with the respective control winding means for selectively varying the amount of direct current supplied thereto, and a reversing switch in the circuit between the control winding means of said second reactor means and said rectifier.

9. In combination, in an electric welder; a bank of main transformers having primary windings and secondary windings, welding current output terminals, rectifier means connected between said secondary windings and said terminals to convert the alternating current output of said secondary windings into a direct current supply to said welding terminals, first saturable core reactor means having iron core means and having load winding means thereon serially connected between each of said secondary windings and said rectifier means, second saturable core reactor means having an iron core and a load winding, said load winding being connected between said rectifier means and at least one of said terminals, said second reactor means also having a control winding variably energizable by a variable direct current for variably saturating the said iron core, a control transformer having a secondary winding, a rectifier connected between the secondary winding of said control transformer and the control winding of said second reactor means for supplying direct current to the control winding of said second reactor means, resistance means in circuit with the control winding for varying the amount of direct current supplied thereto, each said first reactor means also having control winding means variably energizable by direct current for variably saturating the core thereof, and said control winding means of said first reactor means being connected in series, a control circuit connecting said control winding means to the rectifier that is connected with the secondary winding of said control transformer, resistance means in series with the control winding means of said first reactor means in said control circuit, and means under the control of welding current flowing at said terminals for closing said control circuit a predetermined time after welding current commences to flow at said terminals.

10. In combination, in an electric welder; a bank of main transformers having primary windings and secondary windings, welding current output terminals, rectifier means connected between said secondary windings and said terminals to convert the alternating current output of said secondary windings into a direct current supply to said welding terminal, first saturable core reactor means having iron core means and having load winding means thereon serially connected between each of said secondary windings and said rectifier means, second saturable core reactor means having an iron core and also having a load winding connected between said rectifier means and at least one of said terminals, said second reactor means having a control winding variably energizable by a variable direct current for saturating the said iron core, a control transformer having a secondary winding, a rectifier connected between the secondary winding of said control transformer and control winding of said second reactor means for supplying direct current to the control winding of said second reactor means, resistance means in circuit with the control winding of said second reactor means for varying the amount of direct current supply thereto, each said first reactor means also having control winding means, said control winding means being connected in series with each other and in circuit with the rectifier that is connected with the secondary winding of said control transformer for receiving direct current therefrom, resistance means in series with the control winding means of said first reactor means, a normally open switch blade in series with said resistance means, means responsive to the initiation of the flow of current from said terminals for initiating a predetermined time delay at the end of which said normally open switch blade closes thereby providing for dissipation of transient currents in said first reactor means by the striking of the arc followed by controlled voltage after the arc has been struck, and a selector switch in bypassing relation with said normally open switch blade.

References Cited by the Examiner
UNITED STATES PATENTS

| | | | |
|---|---|---|---|
| 720,884 | 2/1903 | Burgess et al. | 323—89 |
| 2,422,958 | 6/1947 | Embry | 323—89.5 |
| 2,924,750 | 2/1960 | Mulder | 323—89 |
| 2,957,086 | 10/1960 | Pettit | 323—89 |
| 3,078,362 | 2/1963 | Steinert | 219—135 |

FOREIGN PATENTS 1,203,700  1/1960  France.

GEORGE N. WESTBY, *Primary Examiner.*